United States Patent
Khan et al.

[11] Patent Number: 6,115,220
[45] Date of Patent: Sep. 5, 2000

[54] LOAD BEAM HAVING PITCH ADJUSTABILITY

[75] Inventors: Amanullah Khan; Warren Coon, both of Temecula, Calif.

[73] Assignee: Magnecomp Corp., Temecula, Calif.

[21] Appl. No.: 09/167,223

[22] Filed: Oct. 6, 1998

Related U.S. Application Data

[60] Provisional application No. 60/062,653, Oct. 8, 1997.

[51] Int. Cl.$^7$ .............................. G11B 5/48; G11B 21/16
[52] U.S. Cl. .................................. 360/244.2; 360/245
[58] Field of Search ................... 360/104, 242.2, 360/245

[56] References Cited

U.S. PATENT DOCUMENTS

| | | | |
|---|---|---|---|
| 5,012,368 | 4/1991 | Bosier et al. | 360/104 |
| 5,285,564 | 2/1994 | Imasaki | 29/603.07 |
| 5,313,353 | 5/1994 | Kohso et al. | 360/104 |
| 5,428,489 | 6/1995 | Takamure et al. | 360/104 |
| 5,526,205 | 6/1996 | Aoyagi et al. | 360/104 |
| 5,570,249 | 10/1996 | Aoyagi et al. | 360/104 |
| 5,796,553 | 8/1998 | Tangren | 360/104 |
| 5,808,836 | 9/1998 | Frater et al. | 360/104 |
| 5,815,349 | 9/1998 | Frater | 360/104 |
| 5,822,154 | 10/1998 | Takahashi et al. | 360/104 |
| 5,838,517 | 11/1998 | Frater et al. | 360/104 |
| 5,838,518 | 11/1998 | Frater et al. | 360/104 |
| 5,870,254 | 2/1999 | Baserman et al. | 360/104 |
| 5,953,183 | 9/1999 | Butler et al. | 360/104 |
| 5,987,733 | 11/1999 | Goss | 29/603.03 |
| 5,991,122 | 11/1999 | Tangren et al. | 360/104 |

FOREIGN PATENT DOCUMENTS

| | | | |
|---|---|---|---|
| 000524629 | 1/1993 | European Pat. Off. | 360/104 |
| 0136979 | 7/1985 | Japan | 360/104 |
| 0074127 | 4/1986 | Japan | 360/104 |
| 0000878 | 1/1988 | Japan | 360/104 |
| 0268172 | 11/1988 | Japan | 360/104 |
| 0281282 | 11/1988 | Japan | 360/104 |
| 0062876 | 3/1989 | Japan | 360/104 |
| 0245477 | 9/1989 | Japan | 360/104 |
| 0248372 | 10/1989 | Japan | 360/104 |
| 0317233 | 12/1989 | Japan | 360/104 |
| 0019182 | 1/1991 | Japan | 360/104 |
| 404188478 | 7/1992 | Japan | 360/104 |
| 404212763 | 8/1992 | Japan | 360/104 |
| 405036035 | 2/1993 | Japan | 360/104 |
| 504135529 | 6/1993 | Japan | 360/104 |
| 40612801 | 1/1994 | Japan | 360/104 |
| 092009076 WO | 5/1992 | WIPO | 360/104 |
| 094016438 A1 WO | 7/1994 | WIPO | 360/104 |

OTHER PUBLICATIONS

Budde, US SIR #H1424, "Transducer Gimbal Structure", East, pp. 1–7.

Budde, US SIR #H1573, "Reduced Mass/Inertia Suspension", East, pp. 1–7.

*Primary Examiner*—A. J. Heinz
*Assistant Examiner*—Franklin D. Altman
*Attorney, Agent, or Firm*—Louis J. Bachand

[57] ABSTRACT

As manufactured disk drive head suspension load beams are modified for facile permanent adjustment in pitch characteristic by a localized reduction in material in the load beam forward portion web and/or rails within a transverse locus to facilitate deflection of the load beam to a different pitch characteristic.

38 Claims, 5 Drawing Sheets

LOAD BEAM HAVING PITCH ADJUSTABILITY

REFERENCE TO RELATED APPLICATION

The present application is based on a provisional application Serial No. 60/062,653 filed on Oct. 8, 1997

BACKGROUND OF THE INVENTION

1. Field of the Invention

This invention has to do with disk drive suspensions, and with load beams for such suspensions. More particularly the invention relates to modifications of load beam to enable adjusting correction thereof after their manufacture and before their installation into the head stack assembly of a disk drive. The invention products and the adjustment method involve departures from conventional design to better enable suspension load beams to be adjustable in their pitch attitude, and, therefore, to be better able to meet increasingly tight tolerance requirements in the disk drive industry.

2. Related Art

Disk drive data storage devices include a drive disk that is written to and read by a magnetic or optical head that is carried by a slider at a desired proximity to the drive disk by a suspension. The suspension comprises a load beam or load beam and flexure combination and an actuator that shifts the load beam and thus the head to a desired track on the disk. The load beam design ensures that the head is spaced a desired distance above the disk, and imparts a designed gram preload to the suspension to offset the air bearing effects of the rotating disk and otherwise maintain the desired slider flight attitude. The combined load beam and flexure provide the slider with a desired angle of disposition relative to the disk, called the pitch attitude, or pitch characteristic. Intricate forming and metal treating steps carried out on a spring steel blank are used to form the load beam having the intended design values, or very close to them. Even the most meticulous load beam manufacturing methods, however, when carried out over a production cycle of tens of thousands of load beams will produce a fair number of anomalous products that are not within specifications. The correction of these defective load beams is painstakingly difficult and in particular instances presently impossible.

SUMMARY OF THE INVENTION

Among the significant properties, and thus among the important design criteria of load beams, are their pitch and roll characteristics. The pitch attitude or characteristic is the angular relation of the slider to the disk. Pitch characteristic can range from parallel, or zero pitch angle, to positive, where the slider is angled toward the oncoming surface, and to negative where the slider is angled away from the oncoming disk surface. The intended angular relation or pitch attitude is a design feature of the suspension comprising the load beam and flexure combination. The roll characteristic is the angular relationship determined by the twist of the load beam in operation, and like the pitch attitude is built into a load beam suspension design. Other parameters of the disk drive device components, e.g. slider and head parameters, are set in view of the expected pitch and roll characteristics, and the other designed characteristics of the load beam. Accordingly, obtention and maintenance of designed pitch and roll characteristics over the manufacturing cycle is critical to the achievement of device performance overall. Failure to maintain pitch and roll characteristics within design specifications will result in a faulty device if the suspension is installed in a disk drive, and accordingly off-specification load beams are scrapped.

It would be desirable to bring off-specification suspension load beams back into design specifications for pitch and roll characteristics, reducing wastage and the occurrence of device failure. Machines are known for adjusting manufactured load beams in their roll characteristics, by appropriate application of force to the load beam along its roll axis. The load beam is taken beyond its elastic limit and it retains its new form.

Pitch characteristic correction is more problematical. Load beam pitch correction requires that the load beam be deflected along its longitudinal axis. The very stiffness of the load beam that is desirable in operation resists this type of correction, and buckling or other destructive response will result from application of an undue corrective force.

It is an object of the invention, therefore, to provide an improved load beam design that will permit pitch correction without loss of desirable properties in the load beam. It is a further object to provide a new design of load beam, one which is readily correctable in its pitch characteristic after manufacture to meet a given tolerance specification, and nonetheless adequately possesses the stiffness characteristic valued in a load beam. Another object is to provide a novel load beam design in which the forward portion of the load beam is permanently deflectable to vary its height. A further object is to provide a novel load beam having a discontinuity about which the load beam is deflectable for pitch adjustment purposes, the discontinuity being so shaped and located that the stiffness of the load beam forward portion is not compromised. Other objects will appear hereinafter.

The objects of the invention are realized in a disk drive head suspension comprising a load beam having a predetermined pitch characteristic, the load beam having a base portion, a spring portion and a longitudinally extended forward portion defining a predetermined locus of bending and including a web having left and right edges and edge rails at the edges in web-stiffening relation, the forward portion having a transversely disposed discontinuity at said predetermined locus about which the forward portion is permanently deflectable to adjust the pitch characteristic of the load beam from the predetermined pitch characteristic.

In this and like embodiments, typically, the transversely disposed discontinuity can be formed solely in the rails; each of the rails is locally discontinuous in transversely opposed relation, each local discontinuity permitting rail portions before and after the discontinuity to vary in distance from each other without rupturing the rails and responsive to bending of the load beam web portion to a new pitch characteristic; each of the rails is discontinued beyond the predetermined locus on the load beam web portion to define the transversely disposed discontinuity and permit the rail portions to bend with the web portion without rupturing the rails; there can also be included a further transverse discontinuity between the discontinuities in the rails, the further discontinuity comprising a localized reduction in the wall thickness of the web within a locus defined by the rail discontinuities and lying transversely of the load beam web portion, the reduction rendering the web portion less stiff at the locus; the further discontinuity comprises an etched region in the web portion providing a reduced stiffness in the web portion over its area; the etched region is of lesser thickness than the surrounding region of the web portion; the etched region is ribbed across at least part of its extent; the etched region defines one or more through holes in the web portion; the etched region occupies from 10 to 90% of the web portion lying within the locus; and/or, the forward portion web is permanently deflected from its predetermined pitch characteristic to a different pitch characteristic.

In a further embodiment, the invention provides a disk drive head suspension comprising a load beam having a predetermined pitch characteristic, the load beam having a base portion, a spring portion and a longitudinally extended forward portion defining a predetermined locus of bending and including a web having left and right edges and edge rails at the edges in web-stiffening relation, the forward portion having a transversely disposed discontinuity at the predetermined locus about which the forward portion is permanently deflectable to adjust the pitch characteristic of the load beam from the predetermined pitch characteristic, the transversely disposed discontinuity being formed solely in the load beam forward portion web.

In this and like embodiments, according to the invention, typically, the transverse discontinuity comprises a localized reduction in the wall thickness of the web within a locus defined between the rails and lying transversely of the load beam web portion, the reduction rendering the web portion less stiff at the locus; the transverse discontinuity comprises an etched region in the web portion providing a reduced stiffness in the web portion over the area of the region; the etched region is of lesser thickness than the surrounding region of the web portion; the etched region defines a surface recess in the web portion, the etched region being ribbed across at least part of the recess; the etched region defines one or more through holes in the web portion; the etched region occupies from 10 to 90% of the web portion lying within the locus; the transverse discontinuity comprises an aperture formed through the wall thickness of the web within a locus defined between the rails and lying transversely of the load beam web portion, the aperture rendering the web portion less stiff at the locus; there is also included a series of apertures within the locus; and the apertures are substantially like in size and shape, the series of apertures extending transversely across the web between the rails.

Further, according to the invention, the discontinuity containing web comprising the forward portion of the load beam also includes each of the rails being locally discontinuous in transversely opposed relation on opposite sides of the web portion transversely disposed discontinuity; each of the rails being discontinuous in transversely opposed relation on opposite sides of the etch region of the web portion; each of the side rails is locally discontinuous in transversely opposed relation on opposite ends of the transverse extent of apertures; the transversely disposed discontinuity comprises a tab-defining cut in the web portion, the tab being permanently deflectable from planarity with the web portion to effectively shift the load beam predetermined pitch characteristic to a different pitch characteristic; and there is included also each of the side rails being discontinuous in transversely opposed relation on opposite sides of the tab.

The invention further contemplates certain methods, including the method of varying the pitch characteristic of a formed load beam comprising a base, a spring portion and a forward portion comprising edge rails and a web therebetween, the load beam defining a predetermined transverse locus of bending including removing from the load beam front portion sufficient material to permit permanent deflection of the load beam front portion about the transverse locus, and permanently deflecting the load beam front portion about the locus to provide the load beam with a different pitch characteristic.

In this and like embodiments, there is also included reducing the height of the edge rails within the transverse locus by removal of material therefrom in deflection facilitating relation; reducing the amount of material in the web within the transverse locus by removal of material therefrom in deflection facilitating relation; etching the web to remove material therefrom within the transverse locus; forming at least one aperture in the web within the transverse locus; forming a transversely extended series of apertures in the web within the transverse locus; forming a recess in the surface of the web within the transverse locus; defining ribs within the recess; freeing a central section of the web within the transverse locus for separate movement as a deflectable tab to vary the pitch characteristic of the load beam; terminating the rails before the end of the web portion to facilitate deflection of the load beam web portion just beyond the rail termination; removing material from the forward portion web within the locus in further deflection facilitating relation; and also removing material from the rails within the locus in further deflection facilitating relation.

BRIEF DESCRIPTION OF THE DRAWINGS

The invention will be further described in conjunction with the attached drawings in which.

DETAILED DESCRIPTION

In presently available recording head suspension load beams the pitch attitude or characteristic is determined at the time of manufacture of the load beam, and there is no known means for changing this pitch characteristic later, e.g. when the slider, or head, is installed on the suspension load beam. In case of a variance in pitch characteristic due to manufacturing tolerances, or in the case of a desired change in pitch from that originally specified, the available pitch value may not be what is a desired. In contrast to roll characteristic variations, where slight twisting of the of the load beam in the relatively less rigid torsion or roll direction may be all that is required to effectuate a roll characteristic change, a pitch characteristic change requires deflection of a highly rigid portion of the load beam. Bending in the load beam spring area will not change pitch very much.

Suspension load beams with pitch and roll values closer to specification than realized with normal manufacturing tolerances are sometimes required as in glide head applications. A glide head, sometimes called a burnishing head or a certifier head, is a head which flies over the disk at a very precise and known height for the purpose of knocking from the disk any protruding disk defects. Other applications for a more precise load beam suspension pitch attitude include comparison studies in which characteristics except those being varied need to be as similar as possible, evaluations of the effects of closer tolerances on a device, qualification of vendors whose products may not meet an existing or proposed the pitch characteristic, and more general manufacturing situations where higher yield may be obtained by correction of certain out of pitch-specification load beams.

Figure 1:
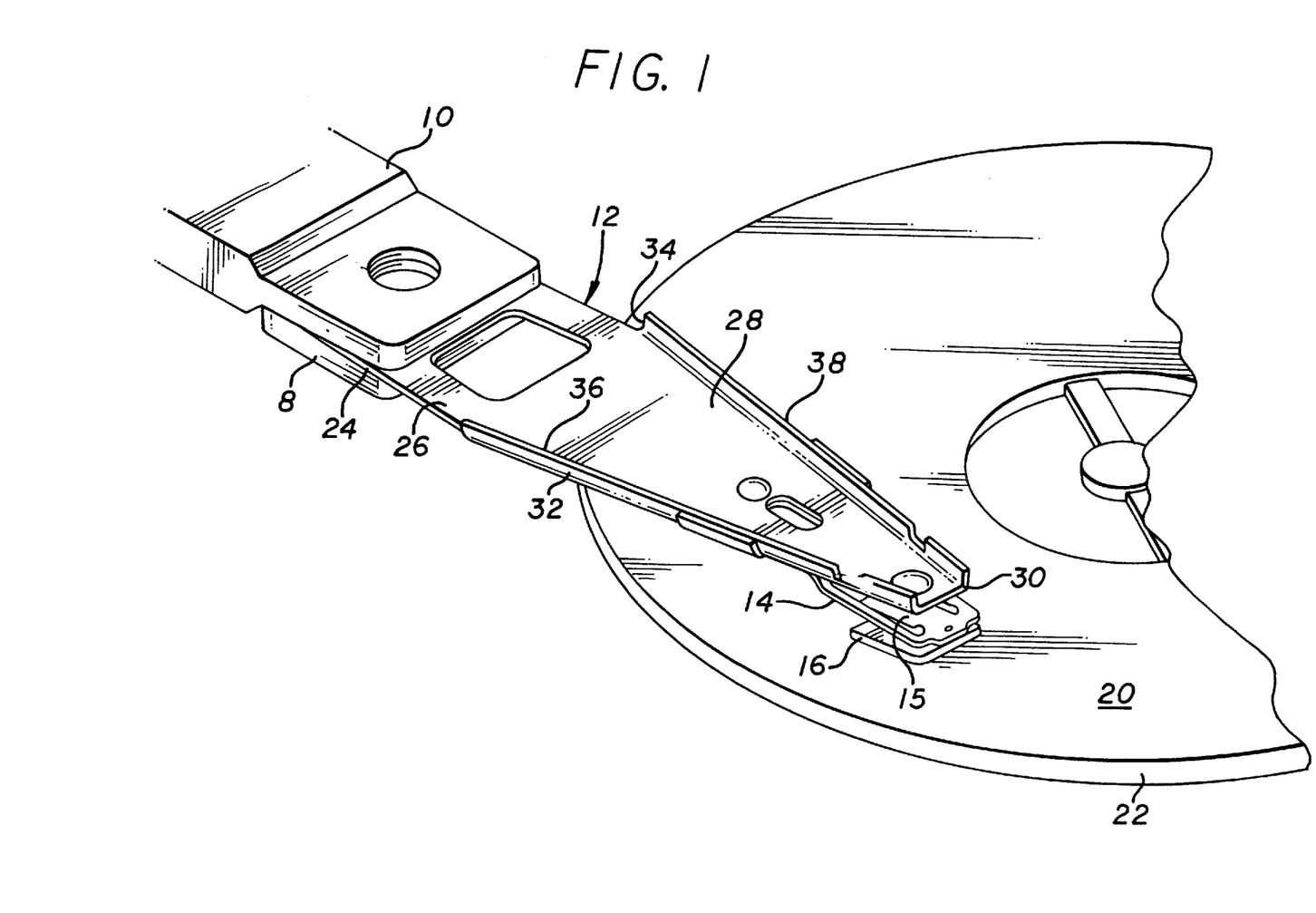
FIG. 1 is an axonometric view of a disk drive disk, load beam and actuator assembly.
Figure 2A:
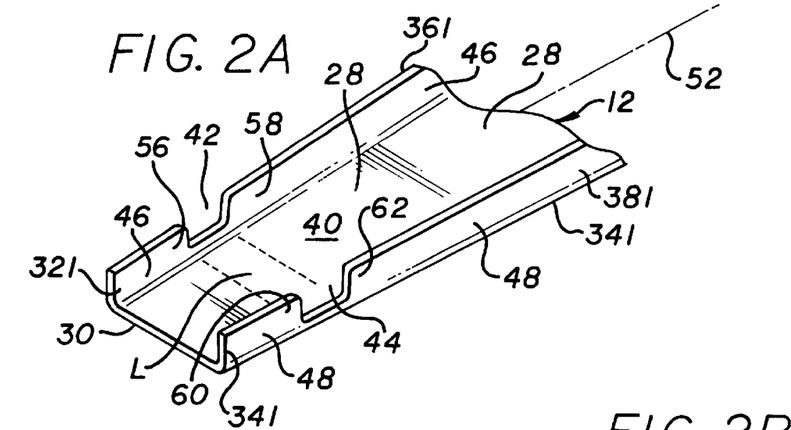
FIG. 2a is perspective view of a first load beam embodiment according to the invention.
Figure 2B:
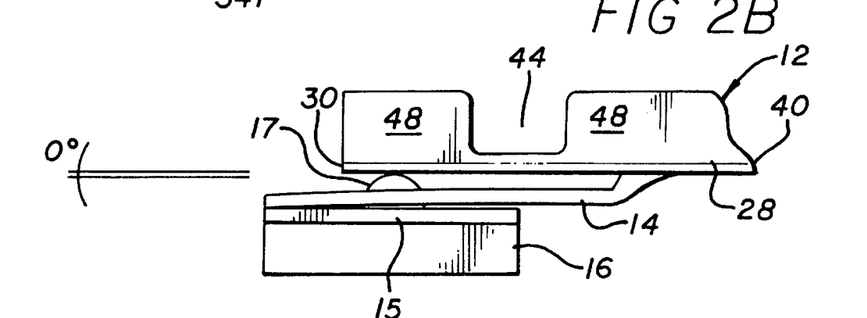
FIG. 2b is a side elevational view thereof in an unadjusted, nondeflected condition.
Figure 2C:
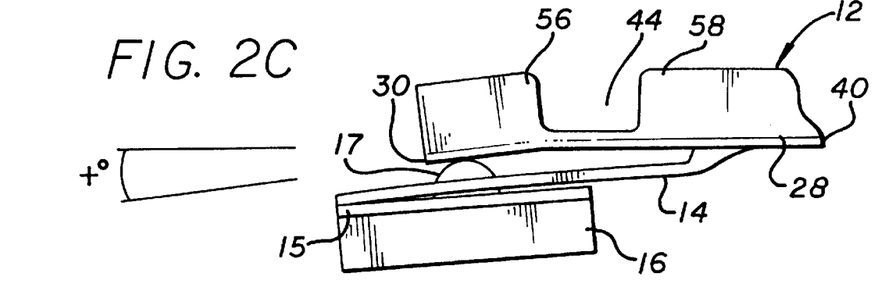
FIG. 2c is a view like FIG. 2b but showing a positive permanent deflection in the load beam attitude.
Figure 2D:
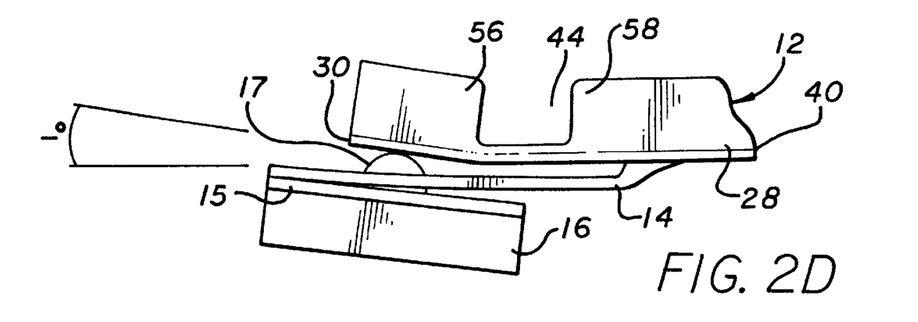
FIG. 2d is a view like FIG. 2b but showing a negative permanent deflection in the load beam attitude.

With reference now to the drawings in detail, in FIG. 1 a more or less conventional disk drive head suspension set-up is depicted including a mounting plate 8, an actuator 10, a load beam 12, a flexure 14, having tongue 15 and dimple 17 (FIG. 2b) and a slider 16 adapted to fly above the surface 20 of the disk 22. The load beam 12 as is usually the case with production load beams includes a base portion 24 connected to the actuator 10 by mounting plate 8 for shifting of the load beam to particular tracks on the disk 22, a spring portion 26 which resiliently pre-loads the load beam to maintain the slider 16 in a desired position above the disk surface 20, and a generally triangular forward portion 28 which continues from the spring portion to the terminus 30 of the load beam. The longitudinal edges 32, 34 of the forward portion 28 each have upstanding flanges forming rails 36, 38 for purposes of stiffening the forward portion and concentrating any bending of the load beam 12 in the intended or predetermined locus defined by the spring portion 26, as will be shown hereinafter. The load beam 12 stands at a given height from the disk surface 22, which is its pitch attitude or pitch characteristic. The pitch characteristic for a given load beam 12 is fixed by design specifications, but manufacturing tolerances will permit some variation. Where such variations in pitch characteristic are intolerable, the pitch characteristic will need to be adjusted and the invention makes this practicable for the first time.

The invention load beam 12 is shown in detail in a first embodiment in FIGS. 2a to 2d. There the load beam forward portion 28 has a generally flat web 40 and modified rails 361, 381 rising from the forward portion web edges 321, 341. Material, generally a series 300 steel, has been removed from the rails 361, 381 by cutting, stamping, etching or other means to form discontinuities 42, 44 in the longitudinally continued extents 46, 48 of the rails. Removal herein includes initial shaping of the load beam 12 to have discontinuities. Discontinuities 42, 44 can take the form of changes in the contour of the rails 361, 381, as shown. Square or open-end-up "C" shaped discontinuities are preferred. The positioning of the discontinuities 42, 44 is critical to the effective implementation of the invention, with the positioning to be at the intended or predetermined locus L of bending the load beam 12. Also, the discontinuities 42, 44 need to be generally opposed across the web 40, i.e., transverse (or transversely disposed) discontinuities, so that the locus L of bending, or deflection is normal to the longitudinal axis 52 of the load beam 12, i.e., transverse to the load beam longitudinal axis. Once the discontinuities 42, 44 are formed, the load beam 12 may be folded or bent about the locus L, past its elastic limit to effect a permanent deflection. See FIGS. 2c and 2d. Contemplating FIGS. 2b, 2c and 2d, more particularly, the removal of material to create discontinuities 42, 44 enables the load beam 12 to bend as intended at locus L, and to bend more easily since there is less material to bend, and the load beam 12 is locally less stiff at the locus L after the material removal. In addition, with reference particularly to FIG. 2d, the rails 361, 381, having localized discontinuities 42, 44 will not crumple onto themselves when the load beam 12 is bent since the material that would otherwise crumple has been removed, and there is consequently room for the rail sections 56, 58 and 60, 62 on either side of the transverse discontinuities 42, 44 to approach each other without need to bend the rail metal as well.

Figure 4:
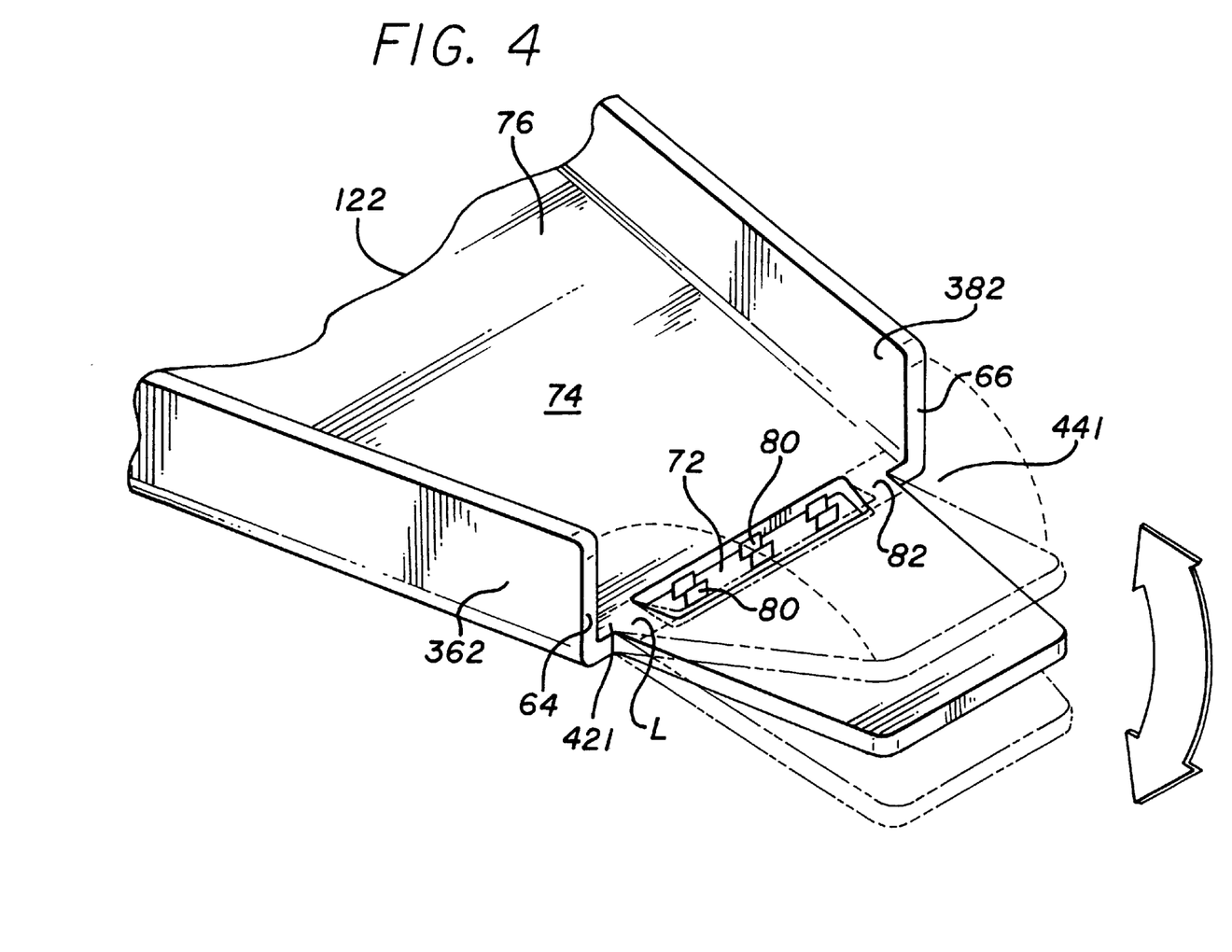
FIG. 4 is a perspective view of a third load beam embodiment according to the invention.

In FIG. 4, a variation of the FIGS. 2a–2d embodiment is shown in which the entire outer end of the rails 362, 382 has been removed, defining the locus L at their respective terminals 64, 66 and transversely across the load beam 122, forming discontinuities 421, 441 such that the load beam can be deflected positively or negatively in the manner of the FIG. 2a–2d embodiment, as shown in phantom.

FIG. 4 also illustrates a further modification of the load beam 122 to have an optional second area of transverse discontinuity 70 in the form of a generally rectangular recess 72, which may be etched into the load beam surface 74, or otherwise formed, and be of various depths from 10% to 100% of the wall thickness of the load beam web 76 so as to form an aperture in the case of a 100% depth. Recess 72 can be a through-hole or aperture, and more or fewer suitably dimensioned ribs 80 may be provided across the recess 72, e.g., as shown, for tailoring specifically the stiffness in the locus L region to a desired value. The recess or aperture may occupy from 10 to 90% of the transverse area 82 between the rails in the locus L.

While shown to have both a transverse discontinuity in the web 76 by virtue of the recess or aperture 72, and further transverse discontinuities 421, 441, as well, the load beam 122 can have either or both of these aids to deflection, as both afford reduced material in the locus L, reduced stiffness in the bending zone, elimination of crumpling problems, and otherwise facilitate deflection as contemplated by the invention.

Figure 3:
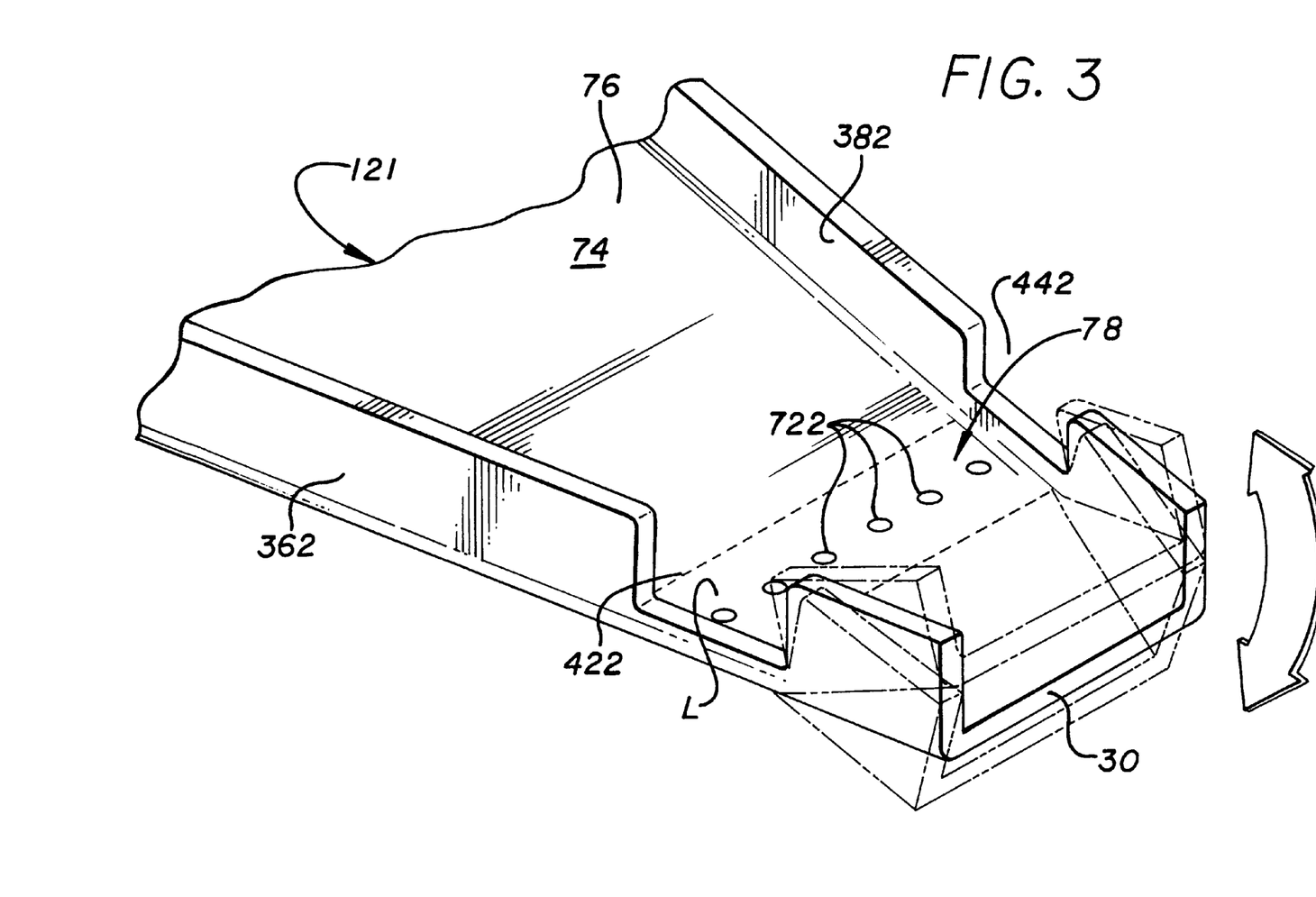
FIG. 3 is a perspective view of a second load beam embodiment according to the invention.

A further form of the invention is shown in FIG. 3. There, load beam 121 has rails 362, 382 provided with a series 78 of apertures 722 defining transversely disposed discontinuities across locus L, for the purpose of removing material and reducing stiffness in the load beam. Additional transverse discontinuities 422 and 442 are provided in the rails 362 and 382 to further facilitate positive or negative deflection, as shown by the phantom lines. As in the previous embodiment, either of these discontinuity conditions can be used alone, as well as in concert as shown.

Figure 5A:
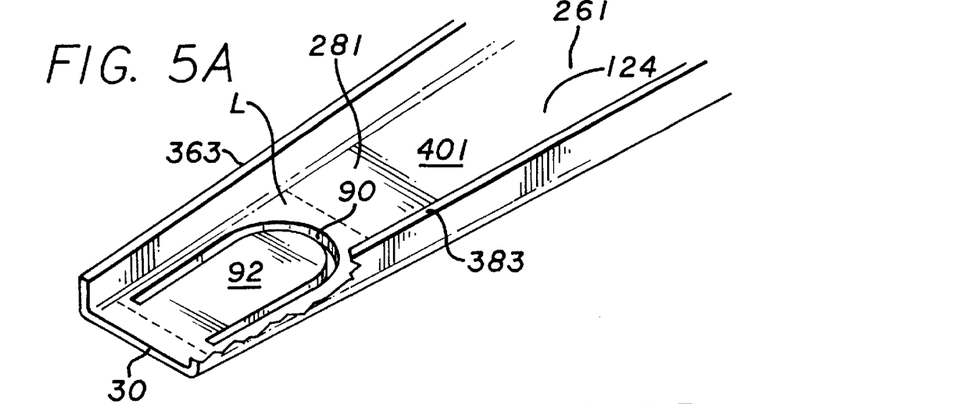
FIG. 5a is a perspective view of a fourth load beam embodiment according to the invention.
Figure 5B:
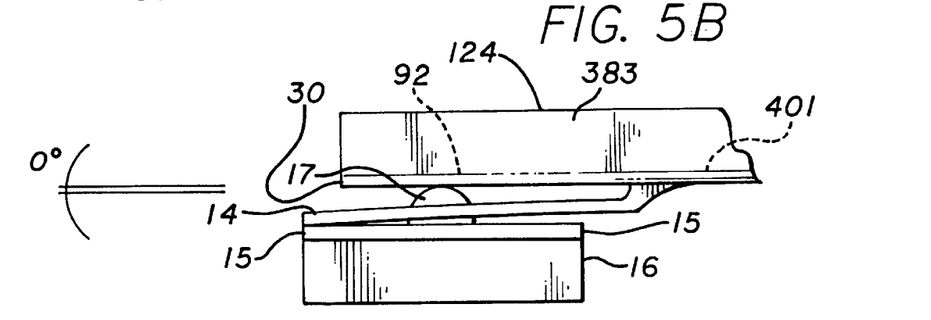
FIG. 5b is a side elevational view thereof in unadjusted, non-deflected condition.
Figure 5C:
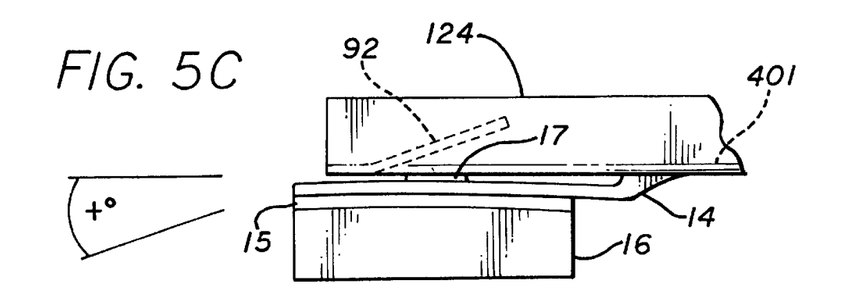
FIG. 5c is a view like FIG. 5b but showing a positive permanent deflection in the load beam attitude.
Figure 5D:
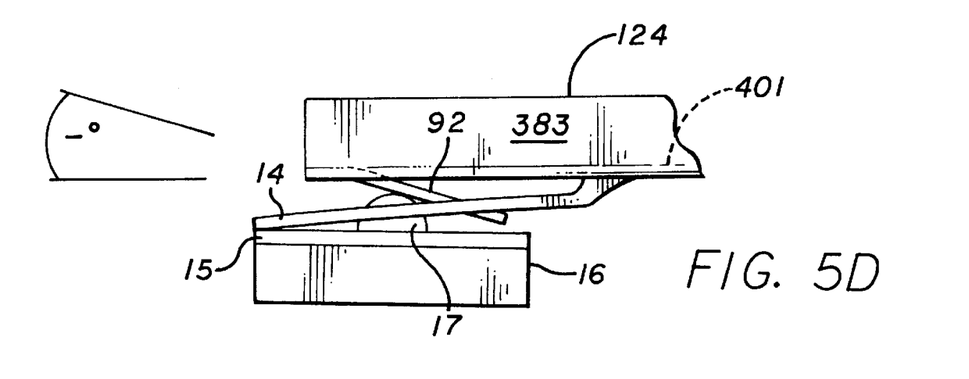
FIG. 5d is a view like FIG. 5b but showing a negative permanent deflection in the load beam attitude.

A further form of the invention is shown in FIGS. 5a–5d. There, the load beam 124 has rails 363 and 383, a forward portion 281 and a web 401 between the rails defining a locus L. Web 401 defines a transverse discontinuity in the form of arcuate cut 90 which begins on one side of the web 401 inwardly adjacent rail 383 and proceeds in an inward turning arc toward the load beam spring portion 261 and the center line of the web, and then turns toward the other rail 363, ending when the arcuate cut is complete as shown. The cut 90 defines a tab 92 that is deflectable. In FIG. 5b the load beam 124 is shown in contact with dimple 17 of tongue 15 of flexure 14, carrying head slider 16. The deflection of the tab 92 is zero. In FIG. 5c, the tab 92 is deflected permanently into the plane of the load beam 124 at a locus between the rails 363, 383. This positive deflection of the tab 92 appears as a change in pitch attitude of the load beam 124 to the opposing head slider 16, as shown. In FIG. 5d, the tab 92 is deflected negatively to extend from the plane of the forward portion web 401, as shown. This negative deflection of the tab 92 appears as a negative change in pitch attitude of the load beam 124 to the opposing head slider 16. The desired load beam attitude or characteristic is thus adjusted.

The foregoing objects of the invention, including provision of pitch attitude correction without loss of desirable properties after manufacture to meet a given tolerance specification, and nonetheless preserve the stiffness characteristic valued in the load beam are thus met.

What is claimed is:

1. A disk drive head suspension comprising a load beam having a predetermined pitch characteristic, said load beam being adapted to support a slider at its distal end and having a base portion, a spring portion and forwardly of said spring portion a longitudinally extended forward portion defining a predetermined locus of bending forward of said spring portion, said locus being closer to said slider-supporting load beam distal end than to said spring portion, said forward portion including a web having left and right edges and edge rails at said edges in web-stiffening relation, said forward portion having a transversely disposed discontinuity at said predetermined locus about which said forward portion is permanently bent to adjust the pitch characteristic of said load beam from said predetermined pitch characteristic.

2. The disk drive head suspension according to claim 1, in which said transversely disposed discontinuity is formed in said rails.

3. The disk drive head suspension according to claim 2, in which each of said rails is locally discontinuous in transversely opposed relation, each said local discontinuity permitting rail portions before and after said discontinuity to vary in distance from each other without rupturing the rails and responsive to bending of said load beam web portion to a new pitch characteristic.

4. The disk drive head suspension according to claim 2, in which each of said rails is discontinued beyond said predetermined locus on said load beam web portion to define said transversely disposed discontinuity and permit said rail portions to bend with said web portion without rupturing said rails.

5. The disk drive head suspension according to claim 2, including also a further transverse discontinuity between the discontinuities in said rails, said further discontinuity comprising a localized reduction in the wall thickness of said web within a locus defined by said rail discontinuities and lying transversely of said load beam web portion, said reduction rendering said web portion less stiff at said locus.

6. The disk drive head suspension according to claim 5, in which said further discontinuity comprises an etched region in said web portion providing a reduced stiffness in the web portion over its area.

7. The disk drive head suspension according to claim 6, in which said etched region is of lesser thickness than the surrounding region of said web portion.

8. The disk drive head suspension according to claim 7, in which said etched region is ribbed across at least part of its extent.

9. The disk drive head suspension according to claim 7, in which said etched region defines one or more through holes in said web portion.

10. The disk drive head suspension according to claim 7, in which said etched region occupies from 10 to 90% of the web portion lying within said locus.

11. The disk drive head suspension according to claim 1, in which said forward portion web is permanently deflected from its predetermined pitch characteristic to a different pitch characteristic.

12. A disk drive head suspension comprising a load beam having a predetermined pitch characteristic, said load beam being adapted to support a slider at its distal end and having a base portion, a spring portion and a longitudinally extended forward portion defining a predetermined locus of bending forward of said spring portion, said locus being closer to said slider-supporting load beam distal end than to said spring portion, said forward portion further including a web having left and right edges and edge rails at said edges in web-stiffening relation, said forward portion having a transversely disposed discontinuity at said predetermined locus about which said forward portion is permanently bent to adjust the pitch characteristic of said load beam from said predetermined pitch characteristic, said transversely disposed discontinuity being formed solely in said load beam forward portion web.

13. The disk drive head suspension according to claim 12, in which said transverse discontinuity comprises a localized reduction in the wall thickness of said web within a locus defined between said rails and lying transversely of said load beam web portion, said reduction rendering said web portion less stiff at said locus.

14. The disk drive head suspension according to claim 13, in which said transverse discontinuity comprises an etched region in said web portion providing a reduced stiffness in the web portion over the area of said region.

15. The disk drive head suspension according to claim 14, including also each of said rails being discontinuous in transversely opposed relation on opposite sides of said etch region of said web portion.

16. The disk drive head suspension according to claim 14, in which said etched region is of lesser thickness than the surrounding region of said web portion.

17. The disk drive head suspension according to claim 16, in which said etched region defines a surface recess in said web portion, said etched region being ribbed across at least part of said recess.

18. The disk drive head suspension according to claim 16, in which said etched region defines one or more through holes in said web portion.

19. The disk drive head suspension according to claim 16, in which said etched region occupies from 10% to 90% of the web portion lying within said locus.

20. The disk drive suspension according to claim 12, in which said transverse discontinuity comprises an aperture formed through the wall thickness of said web within a locus defined between said rails and lying transversely of said load beam web portion, said aperture rendering said web portion less stiff at said locus.

21. The disk drive suspension according to claim 20, including also a series of apertures within said locus.

22. The disk drive according to claim 21, in which said apertures are substantially like in size and shape, said series of apertures extending transversely across said web between said rails.

23. The disk drive suspension according to claim 22, including also each of said side rails is locally discontinuous in transversely opposed relation on opposite ends of said transverse extent of apertures.

24. The disk drive head suspension according to claim 12, including also each of said rails being locally discontinuous in transversely opposed relation on opposite sides of said web portion transversely disposed discontinuity.

25. The disk drive head suspension according to claim 12, in which said transversely disposed discontinuity comprises a tab-defining cut in said web portion, said tab being permanently deflectable from planarity with said web portion to effectively shift the load beam predetermined pitch characteristic to a different pitch characteristic.

26. The disk drive head suspension according to claim 25, including also each of said side rails being discontinuous in transversely opposed relation on opposite sides of said tab.

27. The method of varying the pitch characteristic of a formed load beam that is adapted to support a slider at its distal end, said load beam comprising a base, a spring portion and a forward portion comprising edge rails and a web therebetween, said load beam defining a predetermined transverse locus of bending, said locus being closer to said supporting load beam distal end than to said spring portion, said method including removing from said load beam front portion sufficient material at said predetermined locus to permit permanent deflection of the load beam front portion about said transverse locus, and forming a permanent bend in the load beam front portion about said locus to provide said load beam with a different pitch characteristic.

28. The method according to claim 27, including also reducing the height of said edge rails within said transverse locus by removal of material therefrom in deflection facilitating relation.

29. The method according to claim 28, including also removing material from said forward portion web within said locus in further deflection facilitating relation.

30. The method according to claim 27, including also reducing the amount of material in said web within said transverse locus by removal of material therefrom in deflection facilitating relation.

31. The method according to claim 30, including also removing material from said rails within said locus in further deflection facilitating relation.

32. The method according to claim 30, including also etching said web to remove material therefrom within said transverse locus.

33. The method according to claim 30, including also forming at least one aperture in said web within said transverse locus.

34. The method according to claim 33, including also forming a transversely extended series of apertures in said web within said transverse locus.

35. The method according to claim 32, including also forming a recess in the surface of said web within said transverse locus.

36. The method according to claim 35, including also defining ribs within said recess.

37. The method according to claim 30, including also freeing a central section of said web within said transverse locus for separate movement as a deflectable tab to vary the pitch characteristic of said load beam.

38. The method according to claim 27, including also terminating said rails before the end of said web portion to facilitate deflection of said load beam web portion just beyond said rail termination.

* * * * *